June 20, 1933.  L. HAMMOND  1,915,090
SYNCHRONOUS MOTOR
Filed July 30, 1930   3 Sheets-Sheet 1
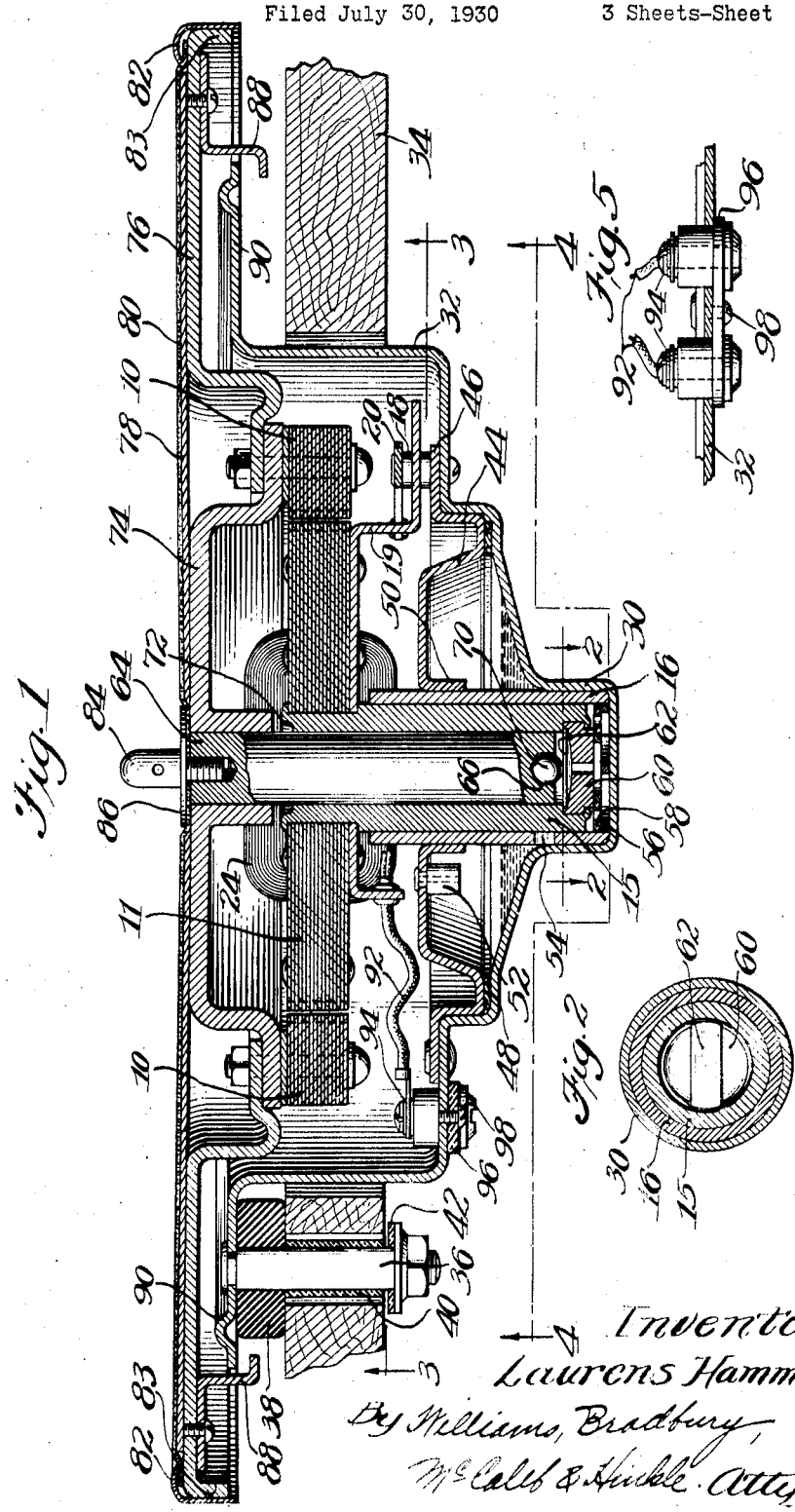

Inventor:
Laurens Hammond
By Williams, Bradbury, McCaleb & Hinkle, Attys.

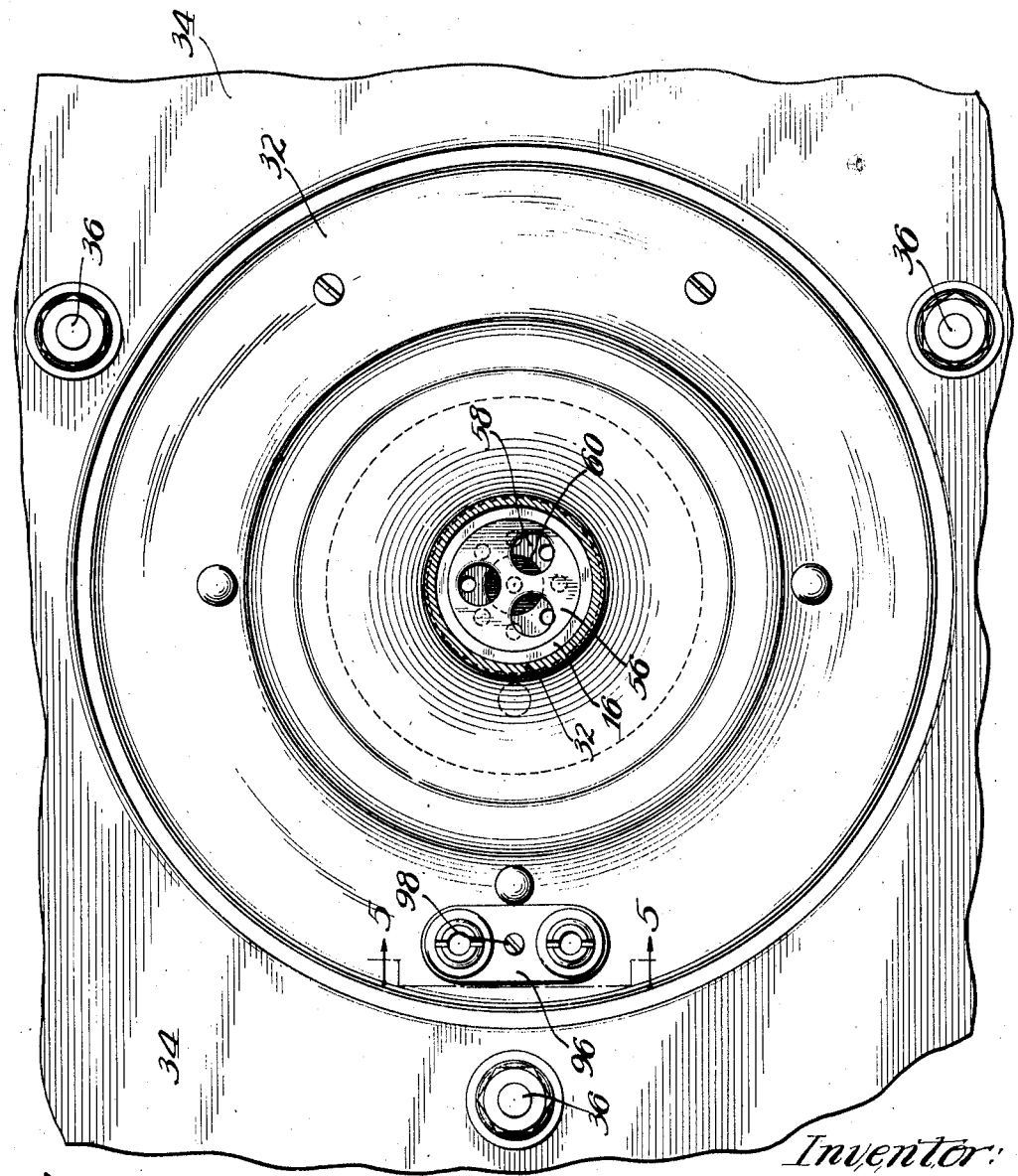

Patented June 20, 1933

1,915,090

UNITED STATES PATENT OFFICE

LAURENS HAMMOND, OF EVANSTON, ILLINOIS, ASSIGNOR TO THE HAMMOND CLOCK COMPANY, OF CHICAGO, ILLINOIS, A CORPORATION OF DELAWARE

SYNCHRONOUS MOTOR

Application filed July 30, 1930. Serial No. 471,655.

My invention is an improvement in synchronous alternating current electric motors particularly suited for the rotation of phonograph turntables, television discs, timing devices and the like, in which uniform speed is desirable.

One object of my invention is to obtain a rugged structure at small manufacturing cost.

Another object of my invention is to provide a synchronous motor in which the driven part rotates smoothly and at substantially uniform speed even with changes in the load and in the voltage of the alternating current supply. This object is accomplished by permitting the stator to oscillate upon the axis of the rotor through an angle on each side of a normal position to which the stator is urged by opposed springs, the moment of inertia of the stator being small compared with that of the rotor, the amount of energy dissipated by the movement of the stator being properly proportioned to the work to be done by the rotor.

Another object of my invention is to provide a motor which will with certainty fall into synchronism when launched at a speed greater than synchronism. This object is accomplished by permitting the stator to rotate or oscillate through an angle substantially greater than the width of a single pole face under a frictional resistance which dissipates more energy in the unit of time in which it rotates in one direction than is dissipated in the same time by the rotor through its load, including friction of its bearings.

Another object of the invention is to provide an energy dissipating friction device for the stator which will maintain its frictional characteristics throughout the life of the motor and in which the friction, and consequently the energy dissipation, will increase when the weight of a phonograph pick-up is added to a phonograph turntable, at which time the load on the motor is increased.

Another object of my invention is to provide a motor in which the rotor surrounds the stator for the purpose, in part, of increasing the ratio between the moments of inertia of the stator and rotor, with the result that unbalanced forces occurring between the rotor and stator, for example, at the frequency of the alternating current, become substantially unnoticeable in the rotor, since the effect of such forces will impart to the rotor and stator movements which are inversely proportional to their moments of inertia. Thus, when my motor is used as here illustrated, the phonograph turntable and rotor will have substantially 32 times the moment of inertia of the stator and the energy causing the relative periodical changes in motion as the poles of the rotor pass the poles of the stator will be expended to an extent greater than 97% in oscillating the stator and less than 3% in accelerating and retarding the rotor and turntable.

Another object of my invention is the provision of a nonspillable oil reservoir to provide continuous flood lubrication.

Another object of my invention is to support the rotor and turntable wholly from a lower bearing, thus to provide a lubricating system whereby an unbroken oil film will be maintained at all times between a large diameter rotor spindle and its bearing sleeve to act not only as a lubricant but also as a cushion to prevent the actual contact of metal to metal through which sound vibration would be conducted, the lower end of the spindle being supported upon a flat spring submerged in oil to further dampen the transmission of sound or other vibration.

Another object of my invention is to completely shield the magnetic parts of my motor by the provision of a case of magnetic material entirely excluded from the magnetic circuit to prevent objectionable coupling with the circuits and apparatus of an associated amplifier.

Still further objects and features of my invention are set forth in the following detailed description and in the appended claims.

My invention is illustrated in the accompanying drawings in which

Figure 1 is a vertical axial section of a complete motor and phonograph turntable;

Figure 2 is a horizontal section taken on the line 2—2 of Figure 1;

Figure 4 is a bottom view, the central portion being in section on the line 4—4 of Figure 1; and Figure 5 is an illustration of the terminal block and binding posts.

Figure 3:
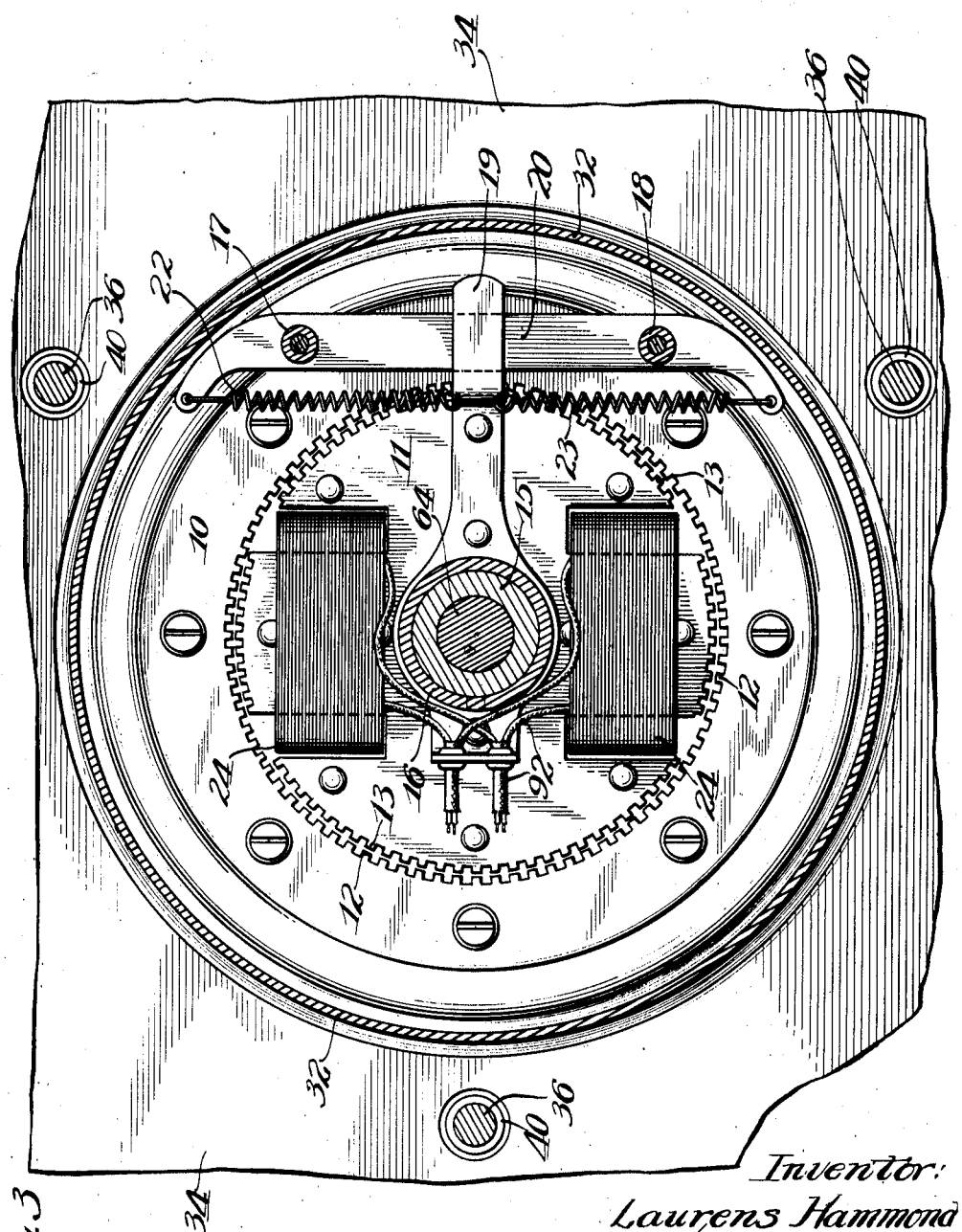
Figure 3 is a horizontal section taken on the line 3—3 of Figure 1.

Referring to Figures 1 and 3, the motor proper comprises a rotor 10 and stator 11, the rotor being internally toothed and the stator externally toothed, providing a number of pole faces 12 and 13 which will give the desired speed of rotation at the impressed frequency of the alternating current, usually sixty cycles per second.

Although the word stator generally implies a stationary field, such term in this instance must be given a broader meaning, since the stator 11 is mounted upon a sleeve 15 supported within an outer bearing 16 in which the sleeve, and consequently the stator, may rotate or oscillate about the axis of the rotor through an angle limited by the stops 17 and 18 and the arm 19, the latter being riveted to the under side of the stator. A yoke 20, supported on the stops 17 and 18, forms the anchorages for springs 22 and 23 also anchored on the arm 19, the tension and strength of the springs being such that the magnetic attraction between rotor and stator will be overcome by the springs just before the arm 19 hits a stop 17 or 18 when the rotor is manually slowly rotated from a position of rest at a time when the electric current is connected to the coils 24.

The laminations of the stator are cut so that each lamination has portions extending through each of the coils 24 and also integral portions forming yokes or external pole pieces, the portions of each lamination extending through the coils being provided with a number of pole faces arcuately arranged and the portions of each lamination forming the yokes being likewise formed with a plurality of pole faces arcuately arranged. The cuts or slots in the stator lamina permit the assembling of the coils without there being any joints or air gap interposed in the magnetic circuits of the coils other than the air gaps between the pole faces of the stator and rotor.

The outer bearing 16 is rigidly supported in a depression 30 formed in the center of a pressed steel housing 32, the latter being secured to the top board 34 of a phonograph or other cabinet by a plurality of bolts 36. The transmission of vibration from the housing to the board 34 is prevented or at least minimized by the provision of shock absorbing cushions 38, sleeves 40, and washers 42 which are preferably made of rubber.

The lower central portion of the housing 32 constitutes part of an oil reservoir which is completed by a pressed metal partition 44, the peripheral flange 46 of which is riveted to the housing 32. A gasket 48 of cork or other suitable material is interposed between the partition 44 and the housing 32 to seal the joint between these parts. The partition 44 has an inwardly bent flange 50 which fits tightly about the outer bearing 16 and has a vent plug 52 secured thereto adjacent the flange 50. The space between the housing 32 and the partition 44 thus forms a non-spillable lubricant reservoir, for no matter in which direction the motor is tilted the lubricant therein will have no way of escaping. Even if the motor is turned upside down the oil will not reach the then upper end of the vent plug 52. While the reservoir is only partially filled with oil, it has been found that this quantity of oil will sufficiently lubricate the bearings for a long time and it is estimated that the lubricant will outlast the useful life of the motor. If, however, additional lubricant should be required, it might be supplied through the vent plug 52. It will be understood that the vent opening in the plug 52 prevents the flooding of oil from the bearing due to thermal expansion of the air in the reservoir.

The outer bearing 16 has an opening 54 through which lubricant is fed to the bearing surfaces of the sleeve 15, from which surfaces the lubricant may seep downwardly into the thrust bearing formed at the lower end of the outer bearing 16. This thrust bearing comprises a pair of suitably perforated metallic washers 56, 58, preferably of brass or bronze, upon which rests an apertured plug 60, rigidly secured in the lower end of sleeve 15. The plug 60 may be made of a phenol condensation product or similar material and forms a support for a strip 62 of a spring steel. The spindle 64, upon which the turntable is mounted, as will hereinafter appear, has a recess 66 formed in its lower end to receive a ball bearing 70 which rests upon the resilient strip 62. The spring strip thus will dampen the transmission of sound or other vibration from the stator supporting sleeve 15 or housing 32 to the turntable. It will be understood that the space surrounding the ball bearing 70, strip 62 and washers 56, 58 is normally completely filled with oil and the parts which bear upon one another thus thoroughly lubricated and sound vibrations dampened by the oil film between the parts. The lubricant of course seeps upwardly around the spindle 64. Any surplus lubricant feeding upwardly around the spindle 64 collects in a shallow groove 72 formed in the upper end of the sleeve 15.

The turntable comprises a pressed steel support 74, forced upon the end of spindle 64, and to which are bolted the rotor laminations 10 and an annular pressed steel plate 76. A thin sheet steel plate 78 which rests upon the parts 74 and 76 is covered by a sheet of felt 80. The peripheral edges of the felt are secured to the plate 76 by a retainer ring 82 which is pressed over the peripheral flange 83 of the plate 76. A centering pin 84 for registration with the openings in the records is screwed into the upper end of the spindle 64, and, through a washer 86, holds the central portion of the felt covering in place.

A plurality of Z-shaped retaining clips 88 are secured against the lower surface of the plate 76, their extremities lying beneath the horizontally extending flange 90 of the housing 32 so as to prevent accidental displacements of the turntable and rotor assembly relative to the remaining portions of the motor.

The coils 24 are preferably connected in parallel by lead-in conductors 92 which are connected to terminals 94. The metallic terminals 94 are secured in a terminal block 96 of insulating material, the latter being secured to the housing 32 by a screw 98.

As previously intimated, certain more or less definite relationships between the inertia of the stator and rotor and between the load, the degree of friction between the stator and its support, and the tensional strength of the springs 22, 23 are highly desirable. The moment of inertia of the rotor assembly should preferably be greater than that of the stator assembly. I have found that a ratio of the rotary moment of inertia of the stator assembly to that of the rotor assembly of 1 to 32 is very satisfactory. It will be understood of course that this ratio is not essential to the satisfactory operation of the motor, and the ratio may be varied throughout a considerable range without greatly affecting the operation of the motor. However, taking into consideration the requirements of commercial production and good musical reproduction, the above mentioned ratio has been found to be practical. It is also highly desirable that the energy dissipated upon movement of the stator be properly proportioned to the work to be done by the motor, satisfactory starting from super-synchronous speed being obtained when the energy thus dissipated during a given time interval is substantially equal to or slightly greater than the work done by the rotor during this interval.

With the above relationships present, the rotor will invariably fall into step and continue rotation at synchronous speed when launched at any speed above synchronism. The dissipation of energy which is essential to cause the rotor to come into synchronism takes place partially between the sleeve 15 and its outer bearing 16 but mainly in friction between the perforated washers 56 and 58 and between the plug 60 and the washer 58. The method of thus dissipating energy is also efficient as a means to prevent hunting. The dissipation of a greater amount of energy is required to cause the rotor to fall into synchronism from super-synchronism speed when the motor is loaded than when the motor is unloaded. Aside from the friction in the bearing from the spindle 64 and the air friction on the turntable, which are substantially constant loads upon a motor, the only load upon the motor is the friction caused by the movement of the stylus of the pick-up in the groove of the record. Thus, when the turntable carries the load of the record and sound pick-up mechanism, the friction upon the end thrust bearing of the sleeve 15 is proportionately increased and consequently the energy dissipated upon movement of the stator is automatically increased upon the application of an increased load of the type for which the motor is particularly designed.

The housing 32 and turntable assembly form a magnetic shield for the motor so that the latter may be used in radio receiving cabinets and electric pick-up phonograph apparatus without affecting or disturbing the amplification system. It will be noted that the motor is of very simple construction and contains but a small number of parts which are of rugged design and that the motor as a whole may be economically manufactured.

With the current turned on, the motor may be very easily started merely by manually rotating the turntable to a speed above the synchronous speed. As the rotor slows down to synchronous speed the necessary dissipation of energy incidental to its falling into step takes place by the swinging of the stator against the tension of the spring 22 or the spring 23, as the case may be, and the subsequent damped oscillation of the stator. Due to the construction of the frictional mounting of the stator, the damping of the oscillation of the stator takes place very rapidly until the stator assumes a position of rest, at which time the spring 22 or the spring 23 (depending upon the direction of rotation of the rotor), will be tensioned sufficiently to counteract the rotor torque. The motor may of course be stopped by manually braking the turntable or by opening the switch through which current is supplied to the coils. In normal use of the motor for playing a number of records it will be found unnecessary to open the switch each time the motor is stopped to change records since no appreciable harm is done by supplying current to the motor while it is standing still. Thus in phonographs having electrical reproducing means, the switch which is used to supply current to the reproducing means may be used to close the circuit to the motor, thus eliminating the necessity of an additional switch in apparatus of this type.

The current consumption of the motor of my invention is considerably less than that of motors customarily used for driving phonograph turntables in the past.

When, as is now general practice throughout the United States, the frequency of the alternating current supplied for general household use is accurately maintained, the motor necessarily operates at exactly the predetermined constant speed. The reproduction of records at the speed at which they were produced is thus assured and the quality of music reproduced improved by the use of the hereinabove described motor in a phonograph. The motor of my invention literally uses the very sensitive and accurate governor employed at the central power station to control its speed instead of using a necessarily cheap and comparatively inaccurate governor applied directly to the motor as is customary.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In a synchronous motor, the combination of a housing, a bearing supported by said housing, a sleeve rotatable in said bearing, a spindle rotatable in said sleeve, a stator and an arm secured to said sleeve, a turntable secured to said spindle and having a rotor cooperable with the stator, a pair of stops on said housing engageable by said arm to limit rotary movement of said stator and sleeve, and a pair of springs having their ends secured respectively to said arm and parts rigid with said housing resiliently to hold said stator substantially midway between said stops.

2. In a synchronous motor, the combination of a housing, a bearing supported within said housing, a sleeve mounted in said bearing for oscillatory movement relative thereto, a spindle having its bearing solely in said sleeve, a stator and an arm secured to said sleeve, a plurality of coils wound about portions of said stator, a turntable secured to said spindle and carrying a rotor cooperable with said stator, a pair of stops on said housing engageable by said arm to limit rotary movement of said stator and sleeve, and a pair of springs having their ends secured respectively to said arm and parts rigid with said housing resiliently to hold said stator substantially midway between said stops.

3. In a motor of the class described, the combination of a shiftable stator composed of a plurality of substantially disc-shaped laminations, said laminations having pairs of slots therein to receive the windings of coils, a rotor comprising a plurality of ring-shaped laminations disposed for cooperation with said stator, said rotor and stator having a plurality of registerable tooth-like projections forming pole faces, and frictional and resilient means to oppose shifting of said stator.

4. In a motor of the class described, the combination of a stator composed of a plurality of substantially circular laminations, said laminations having slots therein to receive a coil, a rotor comprising a plurality of ring-shaped laminations disposed for cooperation with said stator, said rotor and stator having a plurality of tooth-like projections forming pole faces, a turntable having a rotary moment of inertia high with respect to that of the stator and secured to said stator laminations, and frictional and resilient means to oppose movement of said stator.

5. In an alternating current synchronous motor, the combination of an oscillatable stator of relatively small inertia, resilient means to hold said stator against oscillation, a rotor of relatively great inertia associated with said stator and surrounding the same, and frictional means for retarding oscillation of said stator.

6. In an alternating current synchronous motor, the combination of a stator mounted for oscillatory movement, frictional means for retarding such movement of said stator, a rotor having a rotary moment of inertia high relative to that of said stator and being rotatable about the periphery of said stator, resilient means for opposing oscillatory movement of said stator in either direction, and a turntable secured to said rotor.

7. In an alternating current synchronous motor, the combination of an oscillatable stator of relatively small moment of inertia, resilient means to hold said stator against oscillation, means for exciting said stator from a source of alternating current, a rotor associated with said stator for rotation about the periphery thereof and having a rotary moment of inertia many times as great as that of the stator, and frictional means for retarding oscillation of said stator.

8. In an alternating current synchronous motor, the combination of a central stator mounted for oscillatory movement, a rotor mounted for rotation relative to said stator and being supported solely thereby, frictional bearing means carrying the weight of said stator and rotor for retarding movement of said stator, and resilient means for opposing oscillatory movement of said stator in either direction.

9. In an alternating current synchronous motor, the combination of an oscillatable stator of relatively small rotary moment of inertia, resilient means to hold said stator against oscillation, a rotor of relatively great rotary moment of inertia rotatable about the outer edge of said stator, and frictional means for damping oscillations of said stator.

10. In an alternating current synchronous motor, the combination of a substantially circular stator having peripheral pole teeth and mounted for oscillatory movement, frictional means for retarding such movement of said stator, a substantially annular rotor rotatable about the axis of said stator and having pole teeth registerable with the pole teeth of said stator, and resilient means for opposing oscillatory movement of said stator in both directions.

11. In a synchronous motor of the type described, the combination of a central movably mounted stator having a plurality of projecting pole teeth, a rotor mounted for rotation about the axis of said stator and positioned about the peripheral edge of said stator, said rotor having a plurality of teeth registerable with the pole teeth on said stator, and a turntable secured to said rotor, the rotary moment of inertia of said rotor and turntable being much greater than the rotary moment of inertia of said stator.

12. A synchronous motor driven phonograph mechanism comprising a bowl-shaped ferrous housing having an outwardly extending brim, a vertical bearing secured in said housing, a thrust bearing at the lower end of said vertical bearing, a sleeve mounted in said vertical bearing and resting upon said thrust bearing, a resilient member supported in said sleeve adjacent the lower end thereof, a spindle supported by said member and rotatable in said sleeve, a stator carried by said sleeve, means for exciting said stator, a ferrous turntable secured to the upper end of said spindle, a ring-shaped rotor carried by said turntable and surrounding said stator, and yielding means for retarding rotary movement of said stator in either direction.

13. In an alternating current synchronous motor, the combination of a stator of relatively small inertia oscillatable through an angle greater than the angle between its pole faces, resilient means to hold said stator against oscillation, a rotor of relatively great inertia associated with said stator, and frictional means for retarding oscillation of said stator.

14. In an alternating current synchronous motor, the combination of a stator mounted for oscillatory movement through an angle greater than the angular distance between its pole faces, frictional means for retarding such movement of said stator, a rotor rotatable about the axis of said stator, resilient means for opposing oscillatory movement of said stator in either direction, and fixed stops for limiting the extent of the oscillatory movement of said stator.

15. In an alternating current synchronous motor, the combination of a movably mounted stator of relatively small rotary moment of inertia, a rotor cooperable with said stator and having means for the application of a load thereto, and a frictional mounting for said stator arranged to have the quantity of friction retarding movement of said stator increased when the load is applied to said rotor.

16. A synchronous motor driven phonograph mechanism comprising a rotor secured to a turntable, an oscillatory stator cooperable with said rotor and frictional means for retarding oscillation of said stator, said means providing a varying amount of friction dependent upon the weight placed upon said turntable.

17. In an alternating current synchronous motor the combination of a stator mounted for oscillatory movement, a rotor mounted for rotation about the axis of oscillation of said stator, and frictional means normally retarding oscillation of said stator, the degree of friction provided by said means being dependent upon the load on said rotor.

In witness whereof, I hereunto subscribe my name this 25th day of July, 1930.

LAURENS HAMMOND.